(12) United States Patent
Sugawara et al.

(10) Patent No.: US 6,322,218 B1
(45) Date of Patent: Nov. 27, 2001

(54) PROJECTION TYPE DISPLAY

(75) Inventors: Mari Sugawara; Tetsuya Kobayashi; Toshihiro Suzuki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/426,090

(22) Filed: Oct. 22, 1999

(30) Foreign Application Priority Data

Dec. 28, 1998 (JP) .................................................. 10-374558

(51) Int. Cl.⁷ ...................................................... G03B 21/14
(52) U.S. Cl. .................................................. 353/52; 353/57
(58) Field of Search ................................... 353/52, 57, 58, 353/59, 60, 61, 101, 122

(56) References Cited

U.S. PATENT DOCUMENTS 5,136,397 * 8/1992 Miyashita .............................. 353/57
5,842,761 * 12/1998 Futakami et al. ..................... 353/57

FOREIGN PATENT DOCUMENTS

| 7154725 | 6/1995 | (JP) . |
| 07168160 | * 7/1995 | (JP) . |
| 1-116535 | * 7/1995 | (JP) . |
| 2-281249 | * 7/1995 | (JP) . |
| 4-242233 | * 7/1995 | (JP) . |
| 4-60533 | * 7/1995 | (JP) . |
| 8069054 | 3/1996 | (JP) . |
| 8201916 | 8/1996 | (JP) . |

* cited by examiner

*Primary Examiner*—William Dowling
(74) *Attorney, Agent, or Firm*—Greer, Burns & Crain, Ltd.

(57) ABSTRACT

The present invention relates to a projection type display using a transmission type liquid crystal light valve and its object is to provide a projection type display which does not reduce the reliability due to the change of the working environment.

A projection type display of the present invention comprises liquid crystal light valves 4R, 4G and 4B arranged in a body which modulate and emit an incident light form the lamp 2, fans 10 and 12 for cooling the inside of the body, a temperature detecting element 30 for detecting the temperature in the vicinity of the liquid crystal light valve 4G and a control unit 8 for controlling rotational frequencies of the fans 10 and 12 and for controlling on/off of a power source 26 of the lamp 2 based on a compensated temperature after compensating the temperature detected by the temperature detecting element 30 by a predetermined temperature compensation value T0.

12 Claims, 12 Drawing Sheets

FIG. 2

|  | Temperature |
|---|---|
| Temperature detecting element 30 | t °C |
| Liquid crystal light valve 4G | t + 4 °C |
| Liquid crystal light valve 4R | t + 2 °C |
| Liquid crystal light valve 4B | t − 2 °C |

FIG. 12
(a)
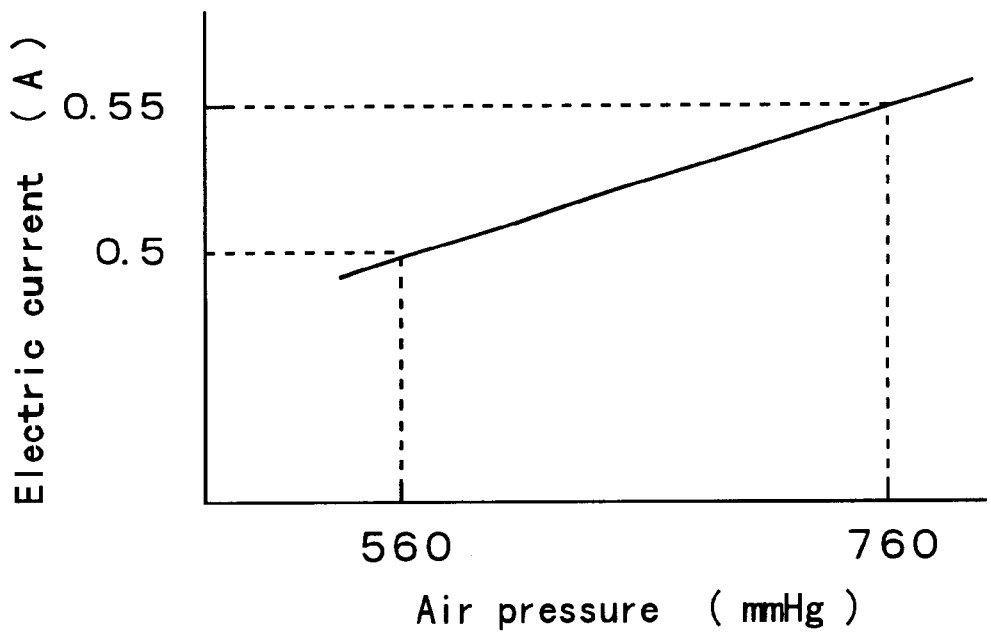
(b)
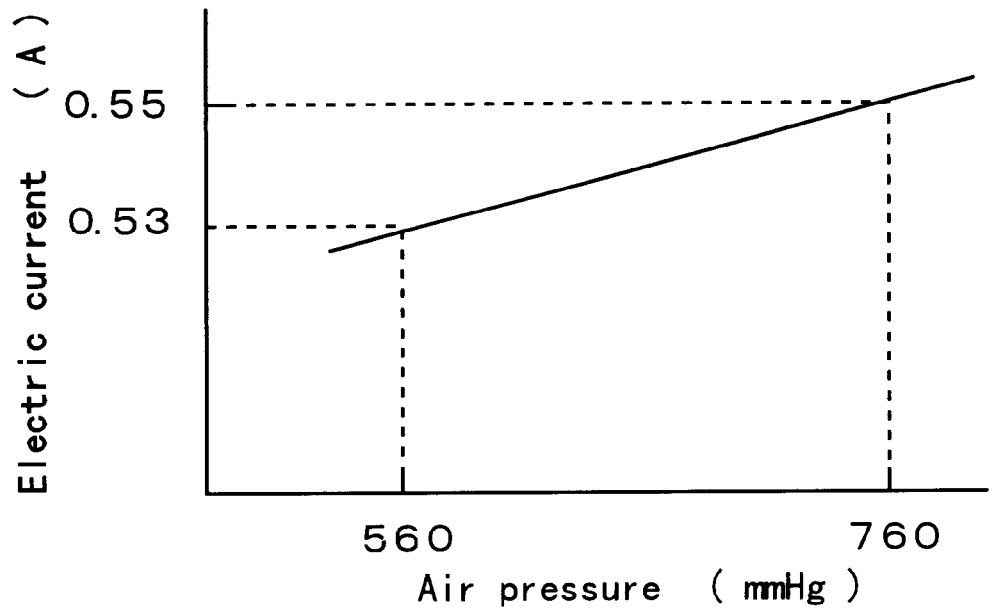

PROJECTION TYPE DISPLAY

BACKGROUND OF THE INVENTION

1. Field of the Invention

The present invention relates to a projection type display using a light valve, particularly to a projection type display using a transmission type liquid crystal light valve.

2. Description of the Related Art

Among projection type displays using a light valve for a light modulation, a projection type display using a liquid crystal light valve called a liquid crystal projector has the potential to replace the display device (CRT) of home televisions and personal computers (PC) in the near future because the liquid crystal projector allows the display of a fine and large image screen. Recently, due to the increase in display resolution required for PC display, finer resolution of the liquid crystal projector has been realized. The resolution has increased from the conventional 640×480 dots (VGA) to 800×600 dots (SVGA) as a standard and it will proceed to the finer 1024×768 dots (XGA) in future.

A schematic structure of the conventional liquid crystal projector 100 is briefly described with reference to FIG. 15. A projection optical system of the liquid crystal projector 100 comprises a lamp 2, three liquid crystal light valves 4R, 4G and 4B and a projection lens 6. Further, the projection optical system has dichroic mirrors DM1 and DM2 for separating a light from the lamp 2 into three colors of red, green and blue, dichroic mirrors DM3 and DM4 for synthesizing the separated three colors and mirrors M1 and M2. The separated three color lights are incident on the liquid crystal light valves 4R, 4G and 4B for each color respectively and are modulated according to the image signals, thereby emitting to the projection lens 6 after synthesized by the dichroic mirrors DM3 and DM4.

An image signal processing system of the liquid crystal projector 100 comprises a control unit 80 to which a image signal from the PC or the video equipment and the like inputs. The image signal inputting to the control unit is converted to a predetermined voltage and supplied to each of the liquid crystal light valves 4R, 4G and 4B. A driving voltage according to the image signal is applied to each pixel of the liquid crystal light valves 4R, 4G and 4B, thus obtaining an image on the screen by changing the transmissivity of each pixel according to the image signal and modulating the light from the lamp 2. Ordinarily, a light source capable of producing a large amount of light such as a metal halide lamp and the like is used as the lamp 2. Therefore, a large electric power is supplied from a power supply 26 and the lamp 2 is heated up to a high temperature.

The heat produced at the lamp 2 increases an internal temperature of the body of the liquid crystal projector 100 by radiation or heat conduction through air. Further, a liquid crystal in the liquid crystal panel structuring the liquid crystal light valve and a polarizing plate attached on a surface of the liquid crystal panel and the like increase the temperature for themselves by absorbing the light. In conventional liquid crystal projector 100 air flows around the liquid crystal light valves 4R, 4G and 4B so that the temperatures of the liquid crystal and the polarizing plate are maintained within a specification temperature determined, for example, at approximately 60° C. An intake fan 10 and an exhaust fan 12 are provided on the body of the liquid crystal projector 100. In FIG. 15, the intake fan 10 is attached in the plane direction of the body and shown by dashed lines. The exhaust fan 12 is provided on the side of the body. An enforced cooling for making a air flow around the liquid crystal light valves 4R, 4G and 4B is performed by rotating these fans 10 and 12. Further, as shown in circular dashed lines in the figure, a filter 14 is mounted on the air inflow side of the intake fan 10 to prevent the dust from entering.

Also, if the temperature of the surrounding environment increases when the apparatus is working, or the filter 14 provided on the intake fan 10 for taking in the external air clogs due to dust and the like, the internal temperature of the apparatus extraordinarily increases, so that the members in the body, specifically, the structure members of the liquid crystal light valve may produce a deterioration in reliability. To avoid this, functions for alerting the operator and automatically stopping the apparatus by detecting the extraordinary temperature are provided to the control unit 80 of the liquid crystal projector 100.

Therefore, a temperature detecting element 30 for detecting the temperatures of the liquid panel and the polarizing plate of the liquid crystal light valve 4G is attached in the vicinity of the liquid crystal light valve 4G. The detecting signal from the temperature detecting element 30 is output to the control unit 80 through a signal line. The control unit 80 compares the temperature detecting signal from the temperature detecting element 30 with the pre-memorized reference value. When the temperature detecting signal exceeds a reference value, the lamp 2 is disconnected or the power supply 26 of the liquid crystal projector 100 is disconnected. In the past, an allowable temperature at the liquid crystal members or the polarizing plate of the liquid crystal light valves 4R, 4G and 4B is set as the reference value of an apparatus specification temperature. When this reference value is exceeded, the power supply 26 is disconnected and lamp 2 is also disconnected.

A thermistor is, for example, used as the temperature detecting element 30 for detecting the extraordinary temperature in the projector 1. Though the temperature detecting element 30 is away from the position where the liquid crystal panel and the polarizing plate become the maximum temperature, it is arranged at the downwind side of the liquid crystal panel as a position which can detect the temperature as close as possible to the maximum temperature. Since the temperature detecting element 30 is away from the maximum temperature point of the members which are monitored, the temperature at the element 30 is increased less due to cooling of from maximum temperature point. Nonetheless, the temperature due to the heat transmitted from the members is actually measured where the temperature detecting element 30 is located.

Here, an operation for disconnecting the power source 26 and the like is described using a flow chart shown in FIG. 16. In FIG. 16, first, a temperature t ° C. in the vicinity of the liquid crystal light valve 4G based on the output from the temperature detecting element 30 (step S100). Next, by comparing a predetermined temperature $t_{OFF}$ for disconnecting the power source 26 with the measured temperature t (step S101). When the temperature t is larger than $t_{OFF}$ (t>$t_{OFF}$), in short, the temperature t exceeds the temperature for disconnecting the power source 26, and the process proceeds to step S102 to process the disconnection of the power source 26. When the temperature t is not larger than $t_{OFF}$ ($t_C$=<$t_{OFF}$), the process proceeds to step S103 because disconnection of the power source 26 is not required. At step S103, a predetermined temperature $t_{ALARM}$ for displaying an alarm and the measured temperature t are compared. When the temperature t is larger than the temperature $t_{ALARM}$ (t>$t_{ALARM}$), in short, the temperature t exceeds the temperature that triggers the alarm, and process proceeds to step S104 to trigger the alarm and then return to step S100. When the temperature t is not larger than $t_{OFF\ a}(t=<t_{OFF})$ at step S103, the alarm display is turned off at step S105 and the process moves to the control of the fans 10 and 12 (step S106). Thereafter, whether or not to complete operation is determined. When the operation is continued, the step returns to step S100 and a new temperature t is acquired.

Thus, the conventional liquid crystal projector 100 measures the temperature in the vicinity of the liquid crystal panel by, for example, the temperature detecting element 30 arranged at the liquid crystal light valve 4G and disconnect the power source 26 and the lamp 2 by comparing the pre-memorized reference value with the measured results to avoid the deterioration or malfunctioning of the liquid crystal or the polarizing pane caused by the heat or light from the lamp 2.

In the meantime, the liquid crystal projector 100, can be for example, fully considered to be used at the position where an altitude is high and an air pressure is low. Since the air pressure decreases and the air is low in density at higher altitudes, when the fans 10 and 12 rotate at the same fan rotational frequency as one at lower altitudes, the cooling effect with respect to the liquid crystal light valves 4R, 4G and 4B reduces. Therefore, the temperatures of the liquid crystal light valves 4R, 4G and 4B reduce. On the contrary, since heat conductivity is reduced by the extent of the reduced density due to the low pressure, the detecting temperature by the temperature detecting element 30 such as a thermistor does not increase as much. In short, the adjustment of temperature detecting sensitivity of the temperature detecting element 30 at the reference altitude (air pressure) does not lead to an accurate measurements of the temperatures of the liquid crystal light valves 4R, 4G and 4B because the detecting temperature based on the output from the temperature detecting element 30 changes when the liquid crystal projector 100 is carried and used at the position higher (or lower) than the reference altitude.

When the liquid crystal projector 100 is used at a position higher in altitude than the reference position, the temperature detecting element 30 detects lower temperatures than the actual temperatures of the liquid crystal light valve. Therefore, the alarm display for alerting an operator or the function for disconnecting the power source 26 and the lamp 2 in case of emergency may not work normally.

On the other hand, when case the sensitivity of the temperature detecting element 30 is adjusted by assuming that the reference altitude is at the predetermined higher position, if the apparatus is used at the lower position than the reference position having the higher air pressure, the functions for the alarming display or for disconnecting the power source 26 and the lamp 2 work even if the temperature is lower than one required evoke these functions. This creates a situation where the expected apparatus specification can not be satisfied.

Further, when the air pressure is low and the environment temperature is high, or the filter 14 is clogged, the internal temperature of the liquid crystal projector 100 increases. In this case, the alarm display detects the extraordinary temperature of the projector 100 or an automatic disconnection of the power source 26 of the projector 100 occurs at the environment temperature lower than the environment temperature which is set at the reference altitude in the apparatus specifications. The environment temperature at which the power source 26 is disconnected is at least required to be equal to the sum of the upper limit value of the specification of the environment temperature and a temperature margin due to the mechanical member intrinsic error. The internal temperature of the apparatus detected, based on the output from the temperature detecting element, 30 becomes the reference for a decision.

Therefore, it is desirable to set the detecting temperature $t_{OFF}$, based on the output from the temperature detecting element 30 for disconnecting the power source 26 when the internal temperature of the apparatus increases extraordinarily, as $t_{OFF}=t_{UP}+\alpha$ in point for protecting the materials from heat. Here, $t_{UP}$ is the upper limit of the temperature characteristics under the apparatus working environment and $\alpha$ is a necessary margin of the machine error or the like.

However, since the situation of $t_{OFF}<t_{up}+\alpha$ occurs when the air pressure reduces as above-mentioned, the characteristic of the apparatus working environment temperature is not satisfied. Therefore, though an air pressure variation margin $\beta$ is also required for the design of $t_{OFF}$, if the $\beta$ is assumed as a fixed value, the margin becomes surplus under a high air pressure environment and the apparatus may be used at higher temperature condition than intended, thereby causing a high burden on the optical members and reduction in reliability.

SUMMARY OF THE INVENTION

An object of the present invention is to supply a projection type display with no reduction in reliability even if the working condition changes.

Above objects are achieved by a projection type display having a light valve arranged in a body for modulating and emitting an incident light from a light source and a cooling unit for cooling the inside of the body, and enlarging and projecting the light emitted from the light valve which comprises a temperature detecting element for detecting at least a temperature in the vicinity of the light valve and a control system for compensating the temperature detected by the temperature detecting element by a predetermined temperature compensation value and for controlling at least the cooling unit and on/off of the power source based on the compensated temperature.

BRIEF DESCRIPTION OF THE DRAWINGS

FIG. 2 shows a relationship between temperatures t ° C. measured by a temperature detecting element 30 and maximum temperatures of liquid crystal light valves 4R, 4G and 4B in the projection type display according to an embodiment of the present invention when an air pressure is equal to an atmospheric pressure.

FIG. 12 shows a relationship of air pressure versus fan current when the fan applied voltage is equal to 10V and a relationship of air pressure versus fan current when the fan rotational frequency is equal to 2,500 rpm, of the projection type display according to an embodiment of the present invention.

DESCRIPTION OF THE PREFERRED EMBODIMENTS

Figure 1:
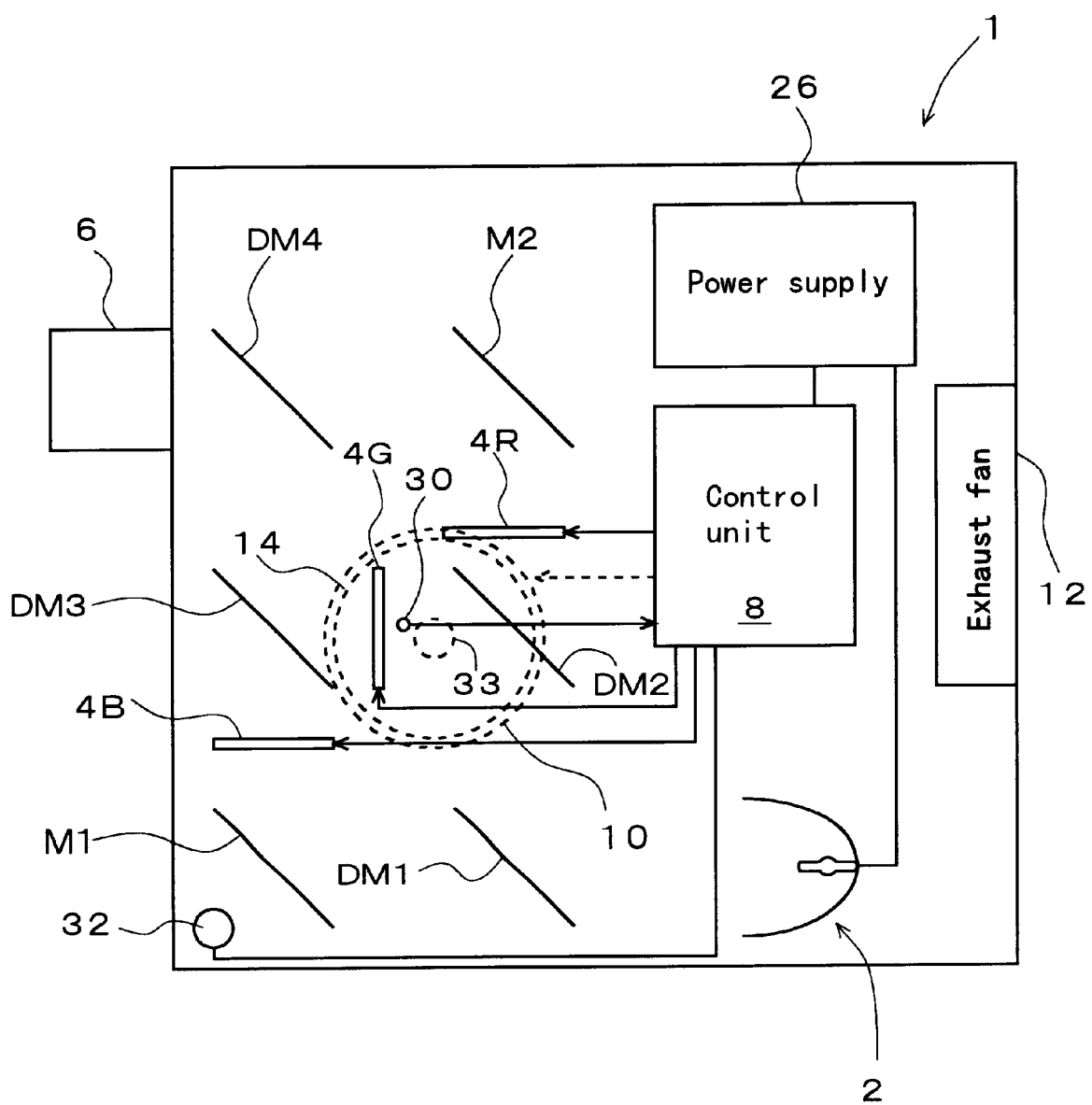
FIG. 1 shows a schematic structure of a projection type display according to an embodiment of the present invention.

A projection type display according to a first embodiment of the present invention is described with reference to FIG. 1 through FIG. 14. First, a schematic structure of the projection type display according to this embodiment is described with reference to FIG. 1. As the projection type display of this embodiment, a liquid crystal projector 1 which uses a transmission type liquid crystal light valve is described as an example. A projection optical system of the liquid crystal projector has, for example, a lamp 2 using a metal halide or the like. Further, the projection optical system, though the figure is omitted, has a shaping optical system for reshaping a white light emitted from the lamp 2 and two dichroic mirrors DM1 and DM2 for separating the reshaped white light into three colors of red, green and blue.

Furthermore, the projection optical system has three liquid crystal light valves 4R, 4G and 4B on which each color of red green and blue separated by the dichroic mirrors DM1 and DM2 is incident. Each of the liquid crystal light valves 4R, 4G and 4B has a liquid crystal panel for respectively driving a plurality of pixels arranged in a matrix shape responding to image signals and a polarizing plate mounted on surface of the liquid crystal panel. The light incident on the liquid crystal valves 4R, 4G or 4B is modulated by the image signals from a control unit 8 and emitted therefrom. Further, the projection optical system, though the figure is omitted, has dichroic mirrors DM3 and DM4 for synthesizing the 3 color lights respectively modulated by the liquid crystal light valves 4R, 4G and 4B and a projection lens 6 for projecting the synthesized light on the screen. Furthermore, a mirror M1 for directing the light to the liquid crystal light valve 4B and a mirror M2 for reflecting the light exiting the liquid crystal light valve 4R are provided.

An image signal procedure system of the liquid crystal projector 1 has the control unit 8 to which image signals from a PC, a video device and the like input. The image signals inputted to the control unit 8 is converted to a predetermined voltage and supplied to each of the liquid crystal light valves 4R, 4G and 4B. A driving voltage corresponding to the image signals is applied to each of the pixels of each of the liquid crystal valves 4R, 4G and 4B and the light from the lamp 2 is modulated by changing a transmissivity of each pixel corresponding to the image signals, thereby allowing to achieve the images on the screen. A light source which can produce a large quantity of light such as a metal halide lamp and the like is used for the lamp 2. Therefore, a large electric power is supplied from a power source 26, so the lamp 2 being heated to a high temperature. In this embodiment, a metal halide lamp having a consumptive electric power of 350 W is used.

The heat generated at this lamp 2 increases the temperature in a body of the liquid crystal projector 1 by a radiation or a heat transmission through air. Also, the liquid crystals in the liquid crystal panels structuring the liquid crystal light valves, the polarizing plates mounted on the surfaces of the liquid crystal panels and the like absorb the heat, thereby increasing the temperatures by themselves. Air is flowed in the vicinity of the liquid crystal light valves 4R, 4G and 4B in the liquid crystal projector 1 to maintain the temperatures of these liquid crystals and the polarizing plates within a specification temperature which is determined, for example, at approximately 60° C. A cooling unit having an intake fan 10 and an exhaust fan 12 is provided on the body of the liquid crystal projector 1. In FIG. 1, the intake fan 10 is mounted on the body in the plane direction and is shown by circular dashed lines. The exhaust fan 12 is mounted on the side plane of the body. A forced air cooling making a air flow in the vicinity of the liquid crystal light valves 4R, 4G and 4B is performed by rotating these fans 10 and 12. Further, though shown by the circular dashed lines in FIG. 1, a filter 14 is mounted on a air inflow side of the intake fan 10 to prevent the dust from entering.

Furthermore, when the internal temperature of the apparatus extraordinarily increases due to an extraordinary increase of the temperature in a setting circumstance during the use of the projector, or due to the clogging of the dust and the like of the filter 14 provided on the intake fan 10 to take in the external air, a reliability of the members in the body, particularly the structuring members of the liquid crystal light valves may be reduced. To avoid this reduction of the reliability, functions to alert an operator or to automatically stop the apparatus by detecting the temperature anomaly are provided in the control unit 8 of the liquid crystal projector 1.

Therefore, a temperature detecting element 30 is attached in the vicinity of the liquid crystal light valve 4G for detecting the temperature of the liquid crystal panel or the polarizing plate on the liquid crystal light valve 4G. A detecting signal from the temperature detecting element 30 is output to the control unit 8 through a signal line. The control unit 8 compares the temperature detecting signal from the temperature detecting element 30 with a predetermined reference value. When the temperature detecting signal exceeds the reference value, the lamp 2 or the power source 26 of the liquid crystal projector 1 is disconnected. Therefore, in the past, an allowable temperature for the liquid crystal materials or the polarizing plates of the liquid crystal light valves 4R, 4G and 4B is set to the reference value as an apparatus specification temperature and when the temperature detecting signal exceeds this reference value, the power source 26 is disconnected for also disconnecting the lamp 2.

Though a thermistor, for example, is used as the temperature detecting element 30 for detecting the extraordinary temperature in the projector 1, it is difficult to arrange the temperature detecting element 30 in the center portion of the polarizing plate or the display panel where increases most in temperature in the apparatus without damaging the display quality of the images. Further, for example, since a position where the temperature becomes the highest on the polarizing plates of the liquid crystal light valves 4R, 4G and 4B deviates a little for every projector 1 due to the dispersion of the setting adjustment of the lamp 2 for every product, even if the setting position of the thermistor of the temperature detecting element 30 is determined in a design, the highest temperature on the polarizing plate can not be necessarily measured. Therefore, though the temperature detecting element 30 is away from the position where the liquid crystal panel and the polarizing plate become highest in temperature, the temperature detecting element 30 is arranged on the downwind side of the liquid crystal panel as the position to be able to detect the possible maximum temperature. Thus, since the temperature detecting element 30 is away at some distance from the maximum temperature point of the members to be detected, the temperature of air which is increased in temperature due to the cooling of the maximum temperature point and the temperature due to heat transmitted from the members where the temperature detecting element 30 is arranged are actually measured. FIG. 2 shows a relationship between a temperature t ° C. measured by the temperature detecting element 30 in the liquid crystal projector 1 and maximum temperatures of the liquid crystal light valves 4R, 4G and 4B when the air pressure is an atmospheric pressure. As understood from FIG. 1 and FIG. 2, the maximum temperature of each liquid crystal light valves 4R, 4G and 4B are different depending upon distances from the lamp 2 to each of the liquid crystal light valves 4R, 4G and 4b and arranging positions of the intake fan 10 and the exhaust fan 12. In this example, the maximum temperatures of the liquid crystal light valves 4R, 4G and 4B are +4° C., +2° C. and −2° C. respectively with respect to the temperature t ° C. measured by the temperature detecting element 30.

Returning to FIG. 1, the liquid crystal projector 1 according to this embodiment has a barometer 32 in the body. A Torricellian tube type barometer or aneroid type barometer can be specifically used as the barometer 32.

Further, the liquid crystal projector 1 according to this embodiment has a flow sensor 33 for measuring a flow velocity of the air flowing in from the intake fan 10. An impeller or the like which rotate, receive the air flow in the vicinity of the intake fan 10 and can be used as the flow sensor 33 where the flow velocity of air can be detected by counting the rotational frequency of the impeller.

Figure 3:
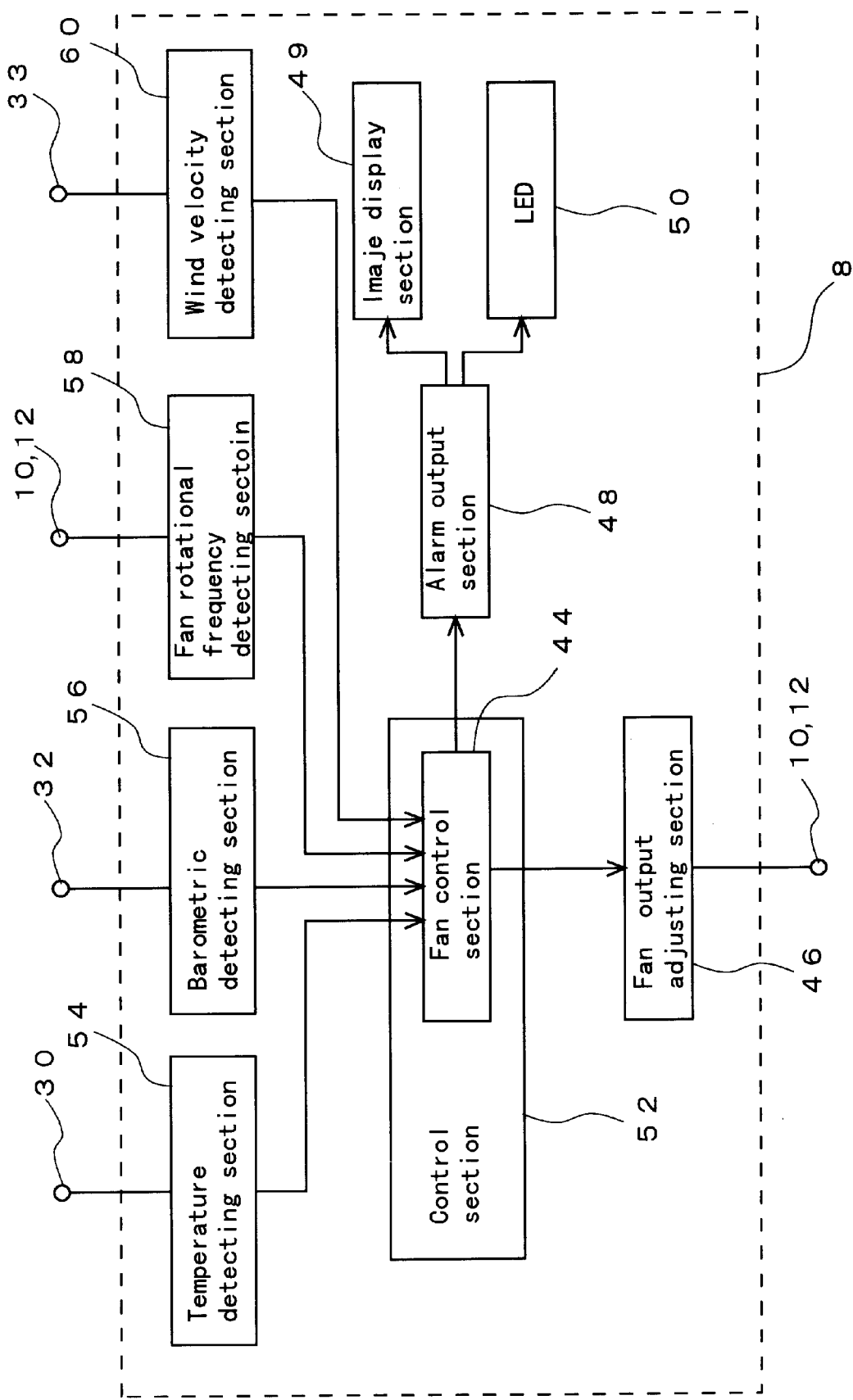
FIG. 3 shows a schematic structure of a control unit 8 of the projection type display according to an embodiment of the present invention.

Next, a structure of the control unit 8 in the liquid crystal projector 1 according to this embodiment is described with reference to FIG. 3. A control section 52 having a microprocessor (MPU: not shown) and a fan control section 44 is provided in the control unit 8. The fan control section 44 controls the rotational frequencies of the fans 10 and 12 through a fan output adjusting section 46 by commands of the microprocessor in the control section 52. Also, the fan control section 44 interposes alarm display contents on the image signals by controlling an alarm output section 48 and then outputs the imposed one on a image display section 49, there by being able to display an alarm on the screen. Further, a LED (light emitting diode) for alarm display provided on the projector 1 can be emitted.

Furthermore, a light source and a lamp control unit (not shown) for controlling the lamp 2 and the light source 26 are provided in the control unit 8. Also, the control unit 8 has a temperature detecting section 54 for detecting a temperature from an output value of the temperature detecting element 30 provided in the liquid crystal projector 1. Further, the control unit 8 has a barometric detecting section 56 for detecting the air pressure from an output value of the barometer 32. Furthermore, pulse generation circuits (for example, two pulses/one rotation) for generating pulses according to the rotational frequencies of the fans are built in driving circuits (not shown) in the fans 10 and 12 and a fan rotational frequency detecting section 58 for detecting the rotational frequencies of the fans 10 and 12 by inputting the pulse signals are provided in the control unit 8. Further, a wind velocity detecting section 60 for detecting a flow velocity of the air at the intake fan 10 by receiving an output from the current sensor 33 is provided in the control unit 8.

[Embodiment 1]

Figure 4:
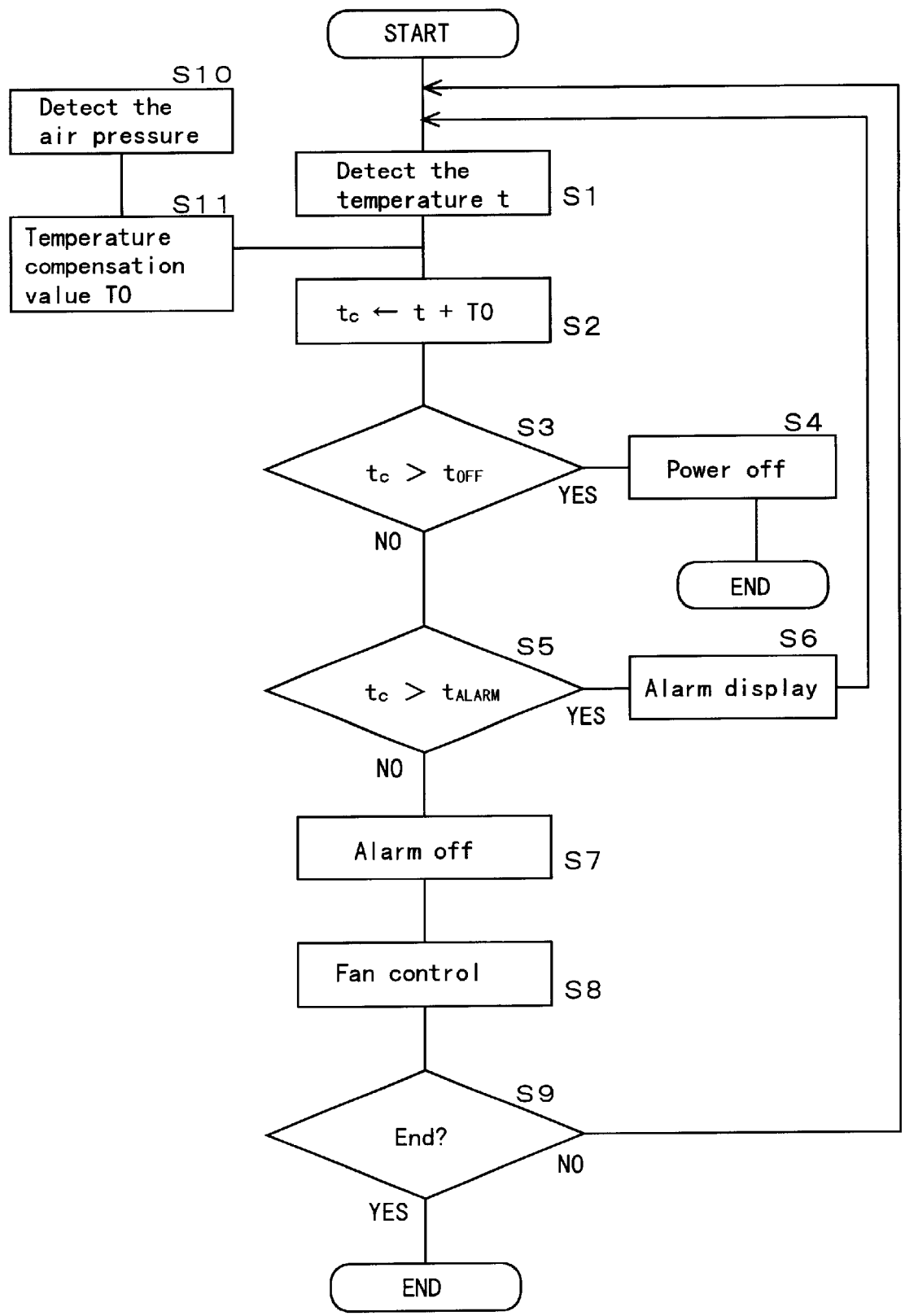
FIG. 4 is a flow chart showing operations of the control unit 8 of a projection type display according to an embodiment of the present invention.

Operations at the control unit 8 in the liquid crystal projector 1 according to the aforementioned embodiment is described using a flow chart shown in FIG. 4. First, the temperature t ° C. in the vicinity of the liquid crystal light valve 4G is detected based on the output from the temperature detecting element 30 (step S1).

Figure 5:
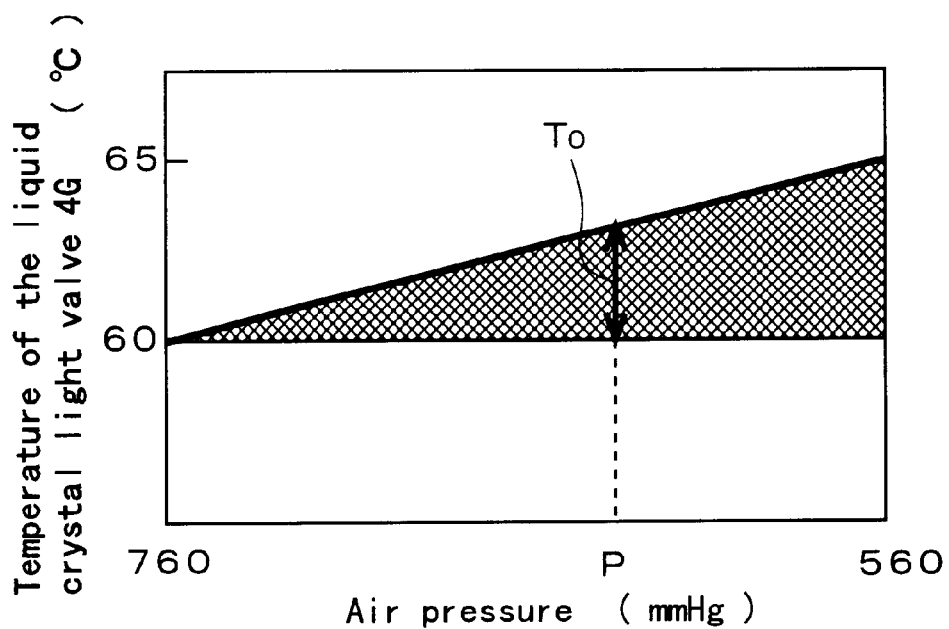
FIG. 5 is a graph for creating a table of air pressure versus temperature in the projection type display according to an embodiment of the present invention.

Then, substantially at the same time as the step S1, an output of the barometer 32 is taken in at the barometric detecting section 56 (step S10) and a temperature compensation value T0 is acquired from a table of air pressure versus temperature predetermined in the control section 52 based on the output of the barometer 32 (step S11). FIG. 5 is a graph for making the table of air pressure versus temperature and shows variations of the panel temperature of the liquid crystal light valve 4G with respect to variations of the air pressure. In FIG. 5, a lateral axis refers to the air pressure (mm Hg) and a vertical axis refers to the temperature of the liquid crystal light valve 4G. Further, FIG. 5 shows that a reference height (pressure) is a position of an atmospheric pressure (760 mm Hg) and data is shown in the direction of air pressure reduction. Further, in FIG. 5, a case in which the temperature t detected by the temperature detecting element 30 is 56° C. and unchanged is shown as the example. In short, a case where the rotational frequencies of the fans 10 and 12 fluctuate due to the fluctuation of the air density depending upon the fluctuation of the air pressure and also a cooling efficiency fluctuates is assumed. In this case, even if the temperature of the liquid crystal light valve 4G changes, the detecting temperature from the temperature detecting element 30 is maintained constant.

Meanwhile, as shown in FIG. 5, since the temperature of the liquid crystal light valve 4G is the temperature t (=56°C.) +4° C. detected by the temperature detecting element 30 at that time (shown in FIG. 2), the temperature is 60° C. under an atmospheric pressure (reference height). Further, the temperature increases linearly in accordance with the reduction of the air pressure. Therefore, by making the table of air pressure versus temperature based on the graph shown in FIG. 5, for example, the temperature variation (T0) of the liquid crystal light valve 4G when the air pressure is P (mm Hg) is acquired (step S11). This temperature variation T0 is added on the temperature t detected by the temperature detecting element 30 as the temperature compensation value T0 (step S2).

Next, a predetermined temperature $t_{OFF}$ for disconnecting the power source 26 and the compensated measurement temperature $t_c$ (=t+T0) are compared (step S3). When the temperature $t_c$ is larger than $t_{OFF}$ ($t_c$>$t_{OFF}$), in short, the temperature $t_c$ exceeds the temperature for disconnecting the power source 26, the step proceeds to the step S4 to process the disconnection of the power source. When the temperature $t_C$ is not larger than $t_{OFF}$ ($t_C$=<$t_{OFF}$), the step proceeds to step S5 because the disconnection of the power source 26 is not required. At step S5, a predetermined temperature $t_{ALARM}$ for displaying the alarm and the compensated measurement temperature $t_C$ are compared. When the temperature $t_C$ is larger than the temperature $t_{ALARM}$ ($t_C$>$t_{ALARM}$) in short, the temperature $t_C$ exceeds the temperature for displaying the alarm, the step proceeds to step S6 to display the alarm and then return to step S1. When the temperature is not larger than $t_{OFF}$ ($t_C$=<$t_{OFF}$) in step S5, the alarm display is turned off at step S7 and the step moves to the control of the fans 10 and 12 (step S8). At step S8, the rotational frequencies of the fans 10 and 12 are controlled by the control unit 8 to set the temperature in the body to a correct value. Thereafter, operation is completed or not is determined. When the operation is continued, the step returns to step S1 and acquires a new temperature t. Operations at steps S10 and S11 are first performed only once in the flow shown in FIG. 4 and no re-acquisition is as a rule performed after the temperature compensation value T0 is once acquired and stored into memory. Therefore, the operations of steps S10 and S11 are preferably performed when the temperature in the body including the atmospheric temperature are in a balanced state after the power source 26 in the liquid crystal projector 1 is connected.

Thus, according to this embodiment, even when the liquid crystal projector is used at higher attitudes or lower altitudes away from the reference height, the temperatures statuses of the liquid crystal light valves 4R and 4G can be accurately grasped to appropriately display the "off" or "alarm" of the power source 26. It should be noted that though the barometer 32 is used for the air pressure detection in this embodiment, as long as the difference of the air pressures can be measured, a diaphragm and sensors of dielectric capacity type and a distortion detecting type may be used.

[Embodiment 2]

Figure 6:
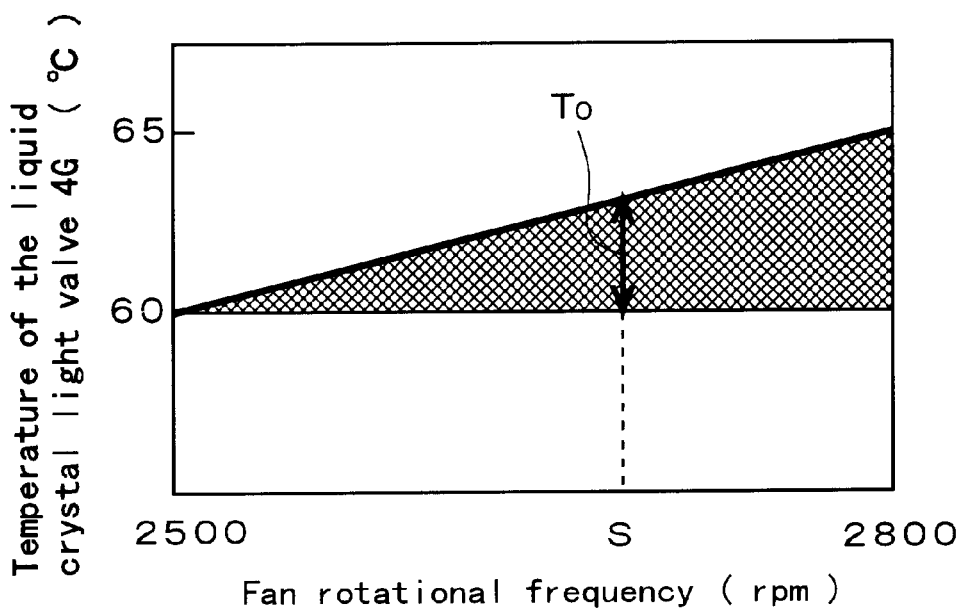
FIG. 6 is a graph showing a relationship of fan rotational frequency versus temperature of the liquid crystal light valve of the projection type display according to an embodiment of the present invention.

Next, a procedure for accurately grasping the temperature statuses of the liquid crystal light valves 4R and 4G and 4B and appropriately displaying "off" and "alarm" of the power source 26 by detecting the variations of the rotational frequency of the intake fan 10, without using the barometer 32 as is described above, is described. This procedure is effective when a maximum applied voltage to the intake fan 10 is predetermined. For example, when the liquid crystal projector 1 is used at a position where the height is higher and the air pressure is lower than the reference height, if the maximum applied voltage V1 is applied to the intake fan, the rotational frequency of the fan increases compared with the time of high pressure because an air resistance to the intake fan 10 reduces by the amount of the reduction of the air pressure. By combining the relationship of air pressure versus fan rotational frequency and the relationship of air pressure versus temperature of the liquid crystal light valve in FIG. 5, a graph showing a relationship of fan rotational frequency versus temperature of the liquid crystal light valve as in FIG. 6 can be obtained. From FIG. 6, a table of fan rotational frequency versus temperature can be created. In FIG. 6, the lateral axis refers to the fan rotational frequency (rpm) and the vertical axis refers to the temperature of the liquid crystal light valve 4G. Further, FIG. 6 shows that the fan rotational frequency at the position where the reference height (pressure) is an atmospheric pressure (760 mmHg) is 2,500 rpm and data in the direction the fan rotational frequency increases therefrom. Furthermore, FIG. 6 exemplifies a case in which, as is the case of FIG. 5, the temperature t detected by the temperature detecting element 30 is 56° C. and unchanged.

Meanwhile, as shown in FIG. 6, the temperature of the liquid crystal light valve 4G linearly increased in accordance with the increase of the fan rotational frequency detected by the fan rotational frequency detecting section 58. Therefore, by creating a table of air pressure versus fan rotational frequency based on the graph shown in FIG. 6, for example, the temperature variation T0 of the liquid crystal light valve 4G when the fan rotational frequency is S (rpm) can be acquired. The above description only replaces the air pressure detection with the fan rotational frequency detection in the procedure at the step S10 in the flow chart shown in FIG. 4 and the rest of the operational procedures is the same.

By performing as above, the temperature statuses of the liquid crystal light valves 4R, 4G and 4B are accurately grasped and "off" and "alarm" of the power source 26 can be appropriately displayed by only monitoring the fan rotational frequency without the arrangement of the barometer 32 in the body.

[Embodiment 3]

Next, a procedure for accurately grasping the temperature statuses of the liquid crystal light valves 4R, 4G and 4B and for appropriately displaying "off" and "alarm" of the power source 26 is described based on another operation. This procedure is effective when the maximum applied voltage V1 to the intake fan 10 is not determined or when the applied voltage V1 has a margin compared with the specifications of the intake fan, and its basic feature is to monitor the applied voltage to the intake fan 10 when the fan rotational frequency is constant.

Figure 7:
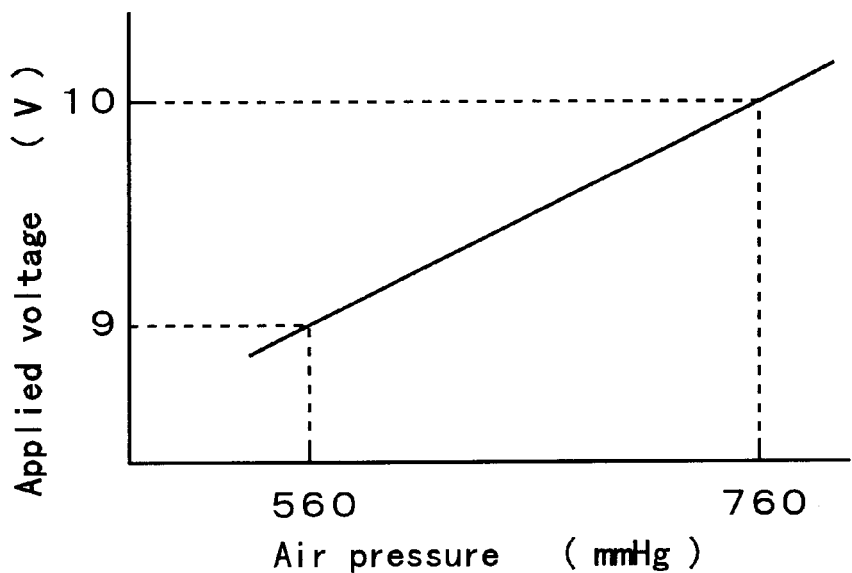
FIG. 7 shows a relationship of air pressure versus fan applied voltage of the projection type display according to an embodiment of the present invention under a constant fan rotational frequency.
Figure 8:
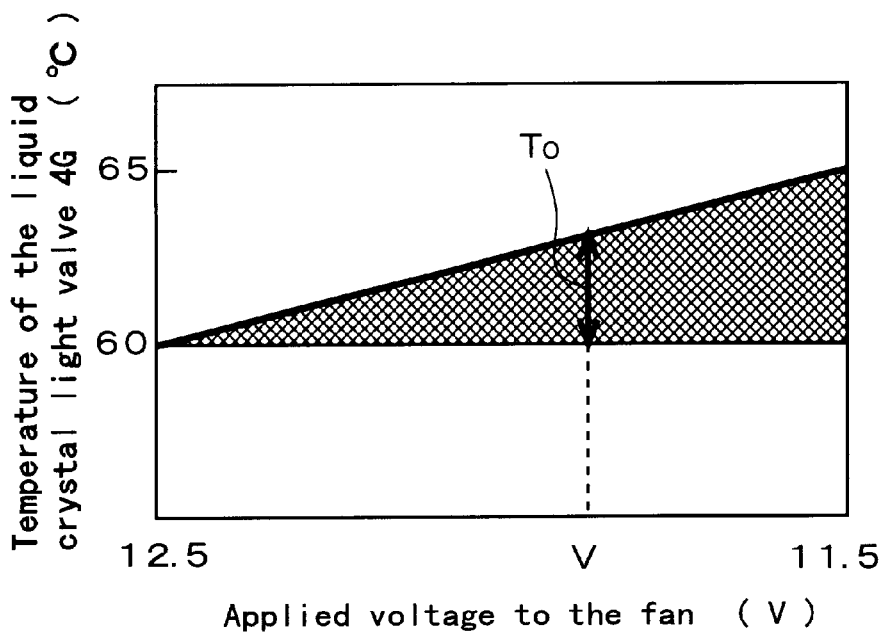
FIG. 8 is a graph showing a relationship of voltage versus temperature of the liquid crystal light valve of the projection type display according to an embodiment of the present invention.

For example, when the air pressure is reduced, a voltage lower than an atmospheric pressure is applied to the intake fan 10, thereby obtaining the same rotational frequency as one under an atmospheric pressure. This is because the air resistance operating on blades of the intake fan 10 reduces when the air pressure reduces and the intake fan 10 can easily rotate. FIG. 7 shows a relationship of air pressure versus fan applied voltage at the rotational frequency of 2500 rpm. As shown in FIG. 7, when the fan rotational frequency is constant, the relationship of air pressure versus fan applied voltage is linear. Therefore, a graph showing the relationship of fan applied voltage versus temperature of the liquid crystal light valve can be obtained as shown in FIG. 8 by combining with the relationship of air pressure versus temperature of the liquid crystal light valve as shown in FIG. 5. A table of fan applied voltage versus temperature can be created from FIG. 8. In FIG. 8, the lateral axis refers to the fan applied voltage (V) and the vertical axis refers to the temperature of the liquid crystal light valve 4G. Further, FIG. 8 shows that the fan applied voltage at the position where the reference height is an atmospheric pressure (760 mm Hg) is 12.5V and data is in the voltage reduction direction therefrom. Furthermore, as is similar to FIG. 5, FIG. 8 exemplified that the temperature t detected by the temperature detecting element 30 is 56° C. and unchanged.

In the meantime, as shown in FIG. 8, the temperature of the liquid crystal light valve 4G linearly increases in accordance with a reduction of the applied voltage to the intake fan 10. Therefore, by creating a table of air pressure versus fan applied voltage based on the graph shown in FIG. 8, for example, the temperature variation T0 of the liquid crystal light valve when the fan applied voltage is V is obtained. The above description only replaces the air pressure detection with the fan applied voltage detection in the procedure at the step S10 in the flow chart in FIG. 4 and the rest of the operation procedures are the same.

By performing as above, the temperature statuses of the liquid crystal light valves 4R, 4G and 4B are accurately grasped and "off" and "alarm" of the power source 26 can be appropriately displayed by only monitoring the fan applied voltage without the arrangement of the barometer 32 in the body in this embodiment as well.

[Embodiment 4]

Figure 9:
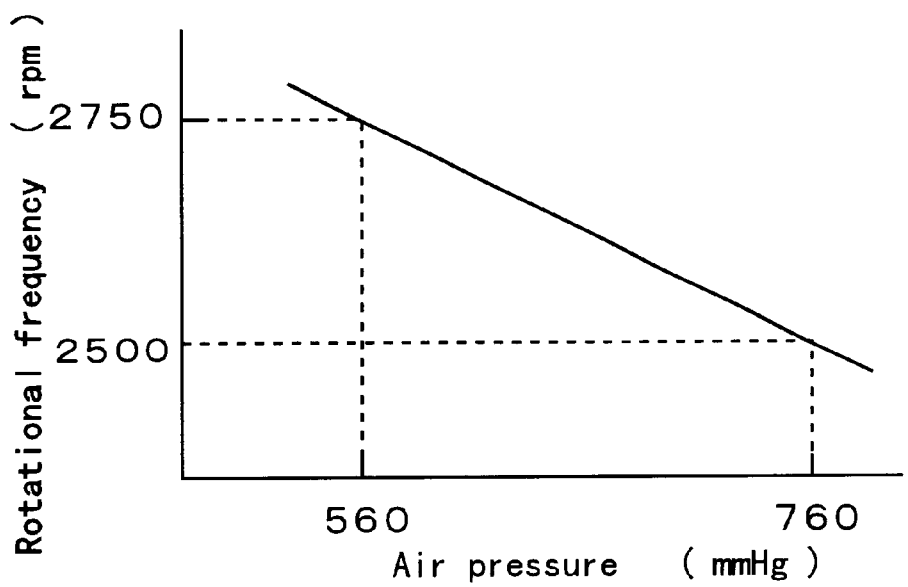
FIG. 9 shows a relationship of air pressure versus fan maximum rotational frequency of the fan of the projection type display according to an embodiment of the present invention when the fan applied voltage is equal 10V.
Figure 10:
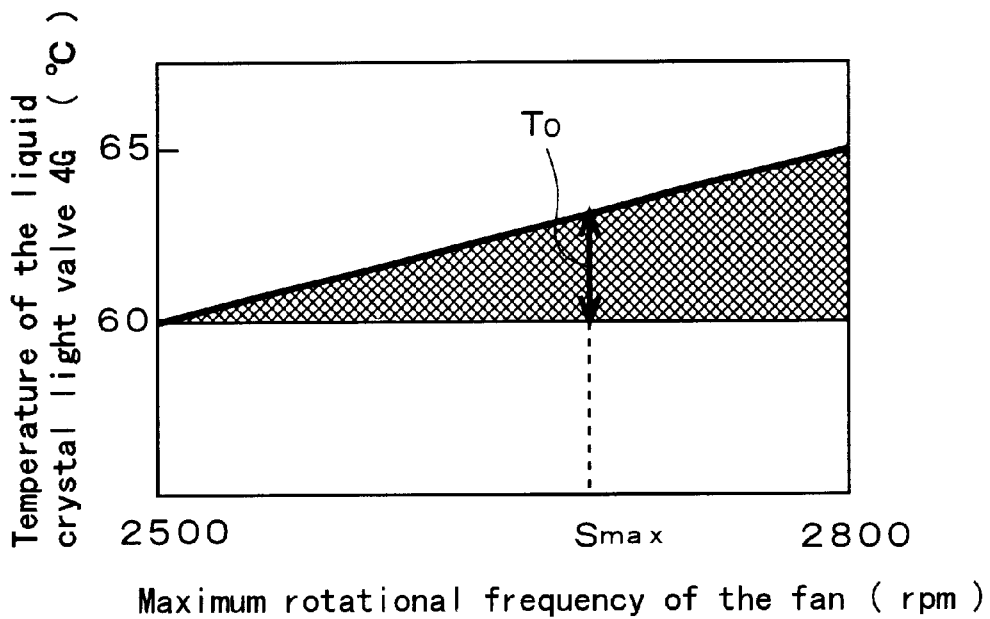
FIG. 10 is a graph showing a relationship of maximum rotational frequency of the fan versus temperature of the liquid crystal light valve of the projection type display according to an embodiment of the present invention.

Next, a procedure by which the temperature statuses of the liquid crystal light valves 4R, 4G and 4B are accurately grasped, and "off" and "alarm" of the power source 26 can be appropriately displayed by detecting the variations of the rotational frequency of the intake fan 10, is described by yet another method which does not use the barometer 32 above-mentioned. This procedure has a feature that the maximum rotational frequency of the intake fan 10 is detected by applying a constant voltage to the intake fan 10. FIG. 9 shows a relationship of air pressure versus rotational frequency of the fan when the fan applied voltage is equal to 10V. As shown in FIG. 9, the relationship of air pressure versus maximum rotational frequency of the fan under a constant fan applied voltage is linear. Therefore, by combining with the relationship of air pressure versus temperature of the liquid crystal light valve shown in FIG. 5, a graph showing a relationship of maximum rotational frequency of the fan versus temperature of the liquid crystal light valve can be obtained as shown in FIG. 10. A table off an maximum rotational frequency versus temperature can be created from FIG. 10. In FIG. 10, the lateral axis refers to the maximum rotational frequency (rpm) of the fan at a predetermined applied voltage and the vertical axis refers to the temperature of the liquid crystal light valve 4G. Further, FIG. 10 shows that the maximum rotational frequency of the fan is 2,500 rpm at the position where the reference height is an atmospheric pressure (760 mm Hg) and data is in the direction in which the maximum rotational frequency of the fan increases. Further, FIG. 10 exemplifies a case in which the temperature t detected by the temperature detecting element 30 is equal to 56° C. and unchanged as is the case in FIG. 5.

A rotational frequency of the fan when a predetermined voltage is applied to the intake fan 10 by changing the air pressure is output by a pulse generation circuit (not shown), thereby detecting the maximum rotation frequency of the fan at the fan rotational frequency section 58.

In the meantime, as shown in FIG. 10, the temperature of the liquid crystal light valves 4G linearly increases in accordance with the increase of the maximum rotational frequency of the fan. Therefore, by creating a table of air pressure versus maximum rotational frequency of the fan based on the graph shown in FIG. 10, the temperature variation T0 of the liquid crystal light valve 4G when, for example, the maximum rotational frequency of the fan is equal to a rotational frequency S-Max (rpm) of the fan can be acquired. The above-mentioned description only replaces the air pressure detection with the fan maximum rotational frequency detection in the procedure at the step S10 in the flow chart shown in FIG. 4. The rest of operation procedures are the same.

In this way, the temperature statuses of the liquid crystal light valves 4R, 4G and 4B are accurately grasped and "off" and "alarm" of the power source 26 can be appropriately displayed by only monitoring the maximum rotational frequency of the fan without the arrangement of the barometer 32 in the body.

[Embodiment 5]

Figure 11:
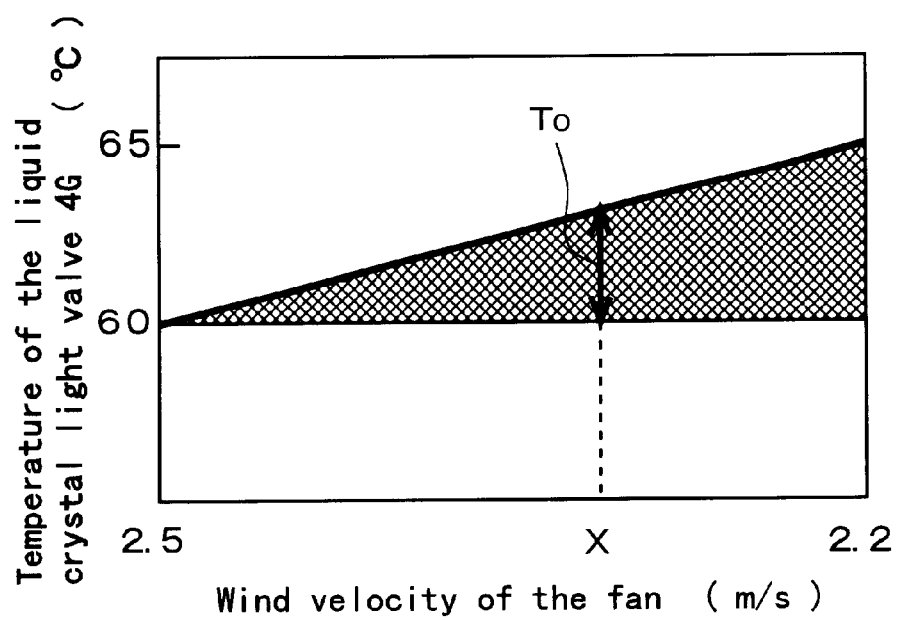
FIG. 11 is a graph for creating a table of fan wind velocity versus temperature of the projection type display according to an embodiment of the present invention.

Next, a procedure for accurately grasping the temperature statuses of the liquid crystal light valves 4R, 4G and 4B and for appropriately displaying "off" and "alarm" of the power source 26 is described based on another operation. This procedure has a fundamental feature which is to monitor the wind velocity of the intake fan 10. It is specifically effective for monitoring the amount of dust in the filter 14 provided at an air inlet of the intake fan 10. The wind velocity of the intake fan 10 is detected by a wind velocity detector section 60 which is provided at the control unit 8 for detecting the flow velocity at the intake fan 10 receiving the signals from the current sensor 33. For example, under an atmospheric pressure, when the filter 14 clogs, the cooling efficiency to the liquid crystal valves 4R, 4G and 4B is reduced in accordance with the reduction of the wind velocity of the fan. They linearly change and a graph as shown in FIG. 11 is obtained. From FIG. 11, a table of wind velocity of the fan versus temperature is created. The lateral axis refers to the wind velocity of the fan (m/s) and the vertical axis refers to the temperature of the liquid crystal light valve 4G. Further, FIG. 11 shows that the temperature of the liquid crystal light valve 4G is equal to 60° C. at the position where the wind velocity of the fan is equal to 2.5 m/s and the temperature of the liquid crystal light valve 4G increases in accordance with the reduction of the wind velocity of the fan. Furthermore, as illustrated in FIGS. 5 and 11, the case in which the temperature detected by the temperature detecting element 30 is equal to 56° C. and unchanged.

By creating a table of wind velocity of the fan versus temperature based on the graph shown in FIG. 11, for example, the temperature variation T0 of the liquid crystal light valve when the wind velocity is equal to X can be acquired. The above mentioned description only replaces the air pressure detection with the fan wind velocity detection in the procedure at the step S10 in the flow chart in FIG. 4. The rest of the operation procedures are the same.

In this way, the temperature statuses of the liquid crystal light valves 4R, 4G and 4B are accurately grasped and "off" and "alarm" of the power source 26 can be appropriately displayed by only monitoring the wind velocity of the fan without the arrangement of the barometer 32 in the body, in this embodiment as well.

[Embodiment 6]

Next, a procedure to accurately grasp the temperature statuses of the liquid crystal light valves 4R, 4G and 4B and to appropriately display "off" and "alarm" of the power source 26 described based on another operation. This procedure has a fundamental feature of fixing the applied voltage of the fan or monitoring the current running in the intake fan 10 when the rotational frequency of the fan is constant.

Figure 13:
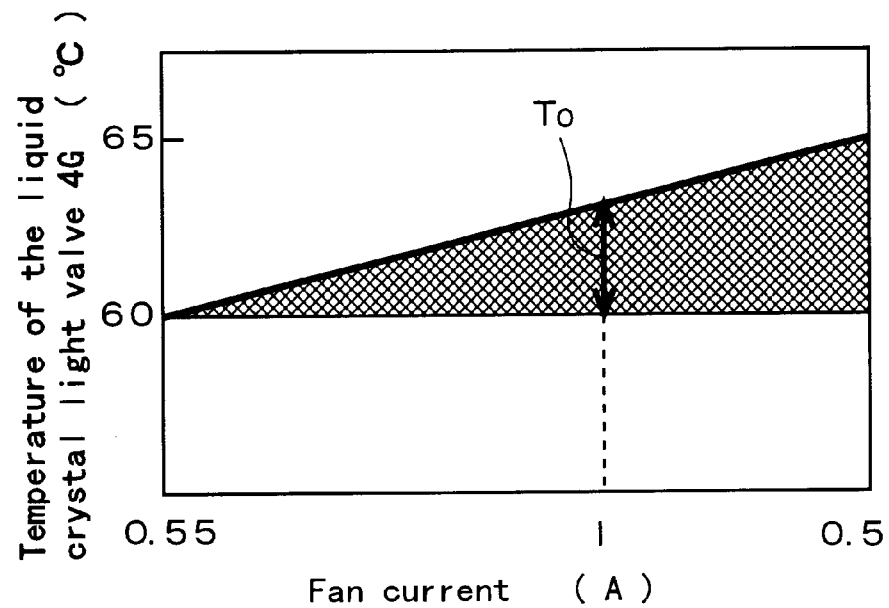
FIG. 13 is a graph showing a relationship of fan current versus temperature of the liquid crystal light valve of the projection type display according to an embodiment of the present invention.

For example, when the air pressure is reduced, the same rotational frequency as one under an atmospheric pressure is obtained by supplying a current lower than one under an atmospheric pressure to the intake fan 10. This is because when the air pressure is reduced, the air resistance operating against the blades of the intake fan 10 is reduced and the intake fan 10 can easily rotate. FIG. 12(a) shows a relationship of air pressure versus fan current when the fan applied voltage is equal to 10V. On the other hand, FIG. 12(b) shows a relationship of air pressure and fan current when the rotational frequency of the fan is equal to 2,500 rmp. As shown in FIG. 12(a) and FIG. 12(b), a relationship of air pressure versus fan current under a constant fan applied voltage and a constant fan rotational frequency is linear. Therefore, by combining with the relation ship of air pressure versus temperature of the liquid crystal light valve shown in FIG. 5, a graph showing a relationship of fan current versus temperature of the liquid crystal light valve is obtained as shown in FIG. 13. A table of fan current versus temperature can be created from FIG. 13. In FIG. 13, the lateral axis refers to the fan current and the vertical axis refers to the temperature of the liquid crystal light valve 4G. Further, FIG. 13 shows that the fan current at the position where the reference height (air pressure) is equal to an atmospheric pressure (730 mm Hg) is equal to 0.55 A and data is shown in the direction of a current value reduction. Furthermore, as is the case of FIG. 5, FIG. 13 exemplifies a case in which the temperature t detected by the temperature detecting element 30 is equal to 56° C. and unchanged.

In the meantime, the temperature of the liquid crystal light valve 4G linearly increases in accordance with the reduction of the current value flowing to the intake fan 10, as shown in FIG. 13. Therefore, by creating a table of air pressure versus fan current based on the graph shown in FIG. 13, for example, the temperature variations T0 of the liquid crystal light valve 4G when the fan current is equal to I is acquired. The above description only replaces the air detection with the fan current detection procedure at the step S10 in the flow chart shown in FIG. 4. The rest of the operation procedures is the same.

In this way, the temperature statuses of the liquid crystal light valves 4R, 4G and 4B are accurately grasped and "off" and "alarm" of the power source 26 can be appropriately displayed by only monitoring the fan applied voltage without the arrangement of the barometer 32 in the body, in this embodiment as well.

[Embodiment 7]

Next, a procedure for accurately grasping the temperature statuses of the liquid crystal light valves 4R, 4G and 4B and for appropriately displaying "off" and "alarm" of the power source 26 is described based on a further operation. This procedure includes the a feature that another temperature detecting element other than the temperature detecting element 30 is also used and the temperature statuses of the liquid crystal light valves 4R, 4G and 4B are grasped based on the difference of the temperatures detected by each temperature detecting element. Therefore, this procedure has a superior point to be effectively usable even if there is no detecting unit to directly detect the air pressure. The other temperature detecting elements are attached, for example, to be above the temperature detecting element 30 in the plan view showing the liquid crystal projector 1 in FIG. 1, to be in the vicinity of the intake fan 10 and to expose the detecting section on the outside of the body. In this way, the temperature detecting element expose on the outside of the body monitors the environmental temperature where the liquid projector 1 is arranged. When the air pressure is reduced, the temperature of the temperature detecting element 30 in the apparatus becomes higher with respect to the environment temperature, and when the air pressure increases, the reverse occurs. Therefore, as shown in FIG. 14, the variations of the air pressure can be known from the difference value between the environment temperature and the temperature of the temperature detecting element 30.

Figure 14:
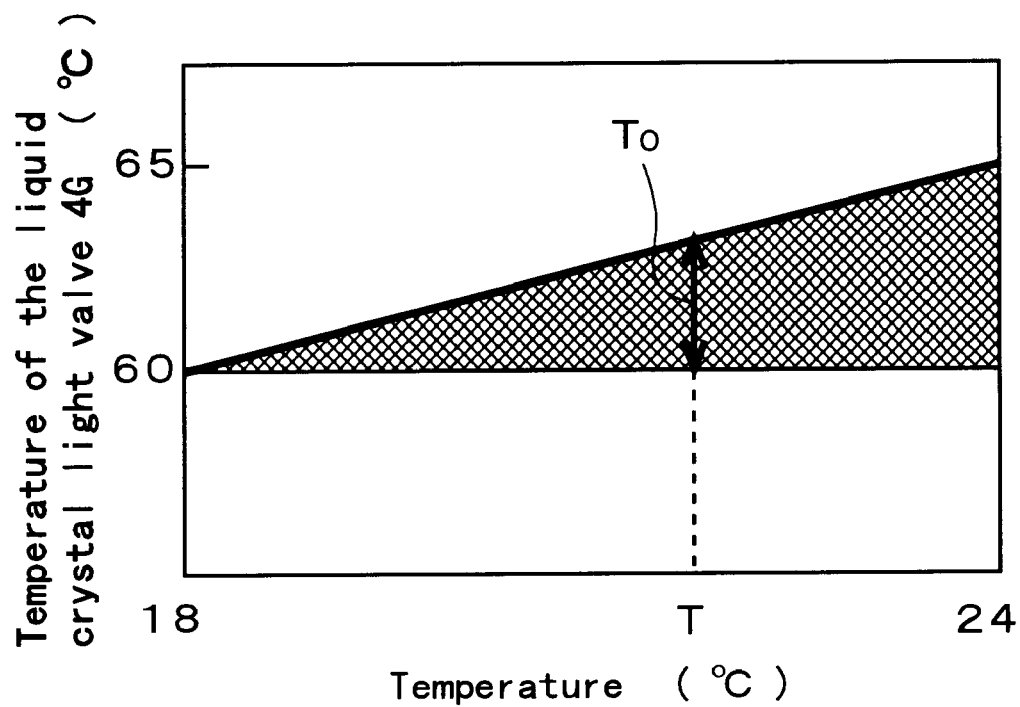
FIG. 14 is a graph for learning air pressure variations from the difference between an environment temperature and the temperature at the temperature detecting element 30 of the projection type display according to an embodiment of the present invention.
Figure 15:
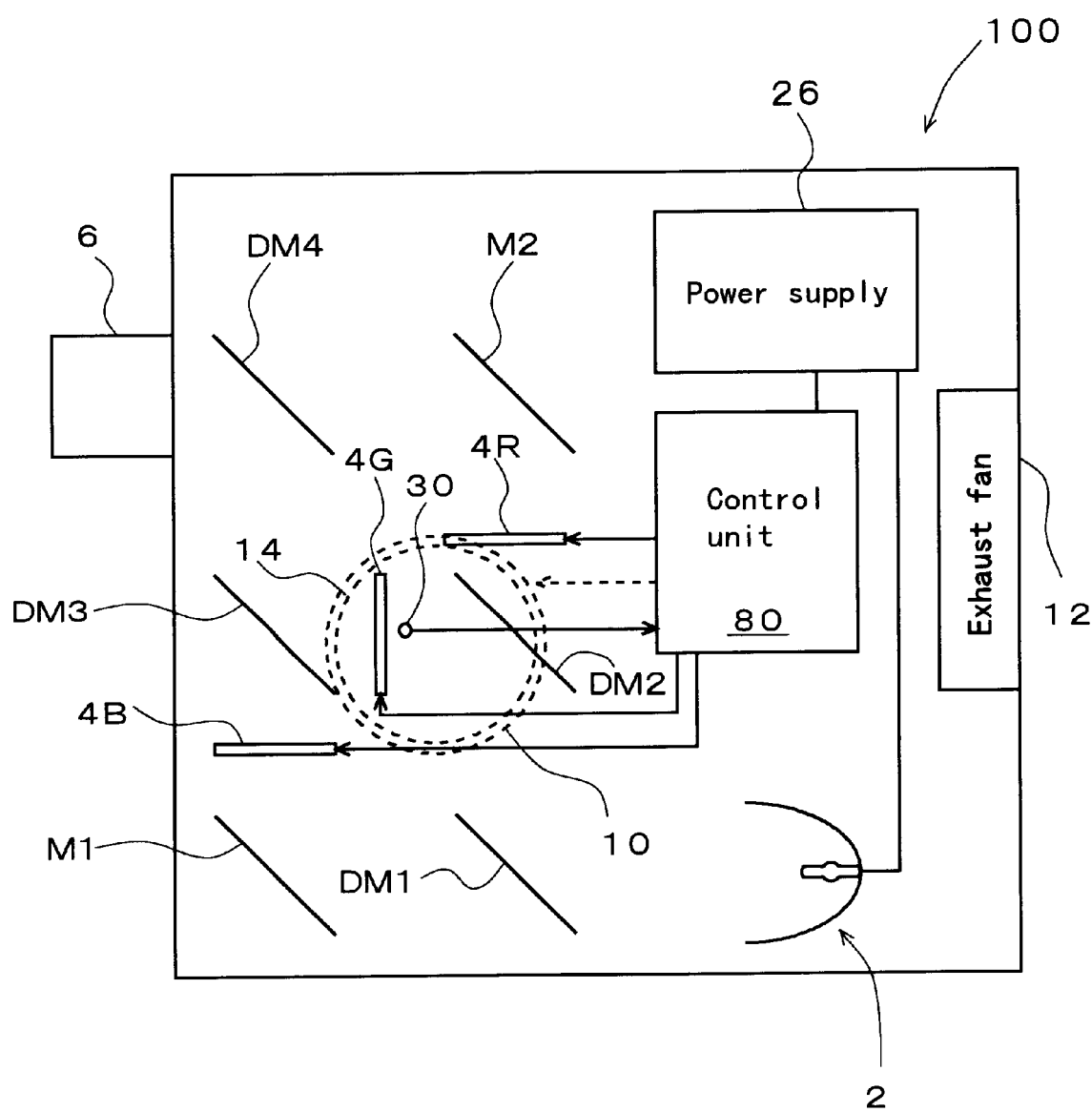
FIG. 15 shows a schematic structure of the conventional liquid crystal projector.
Figure 16:
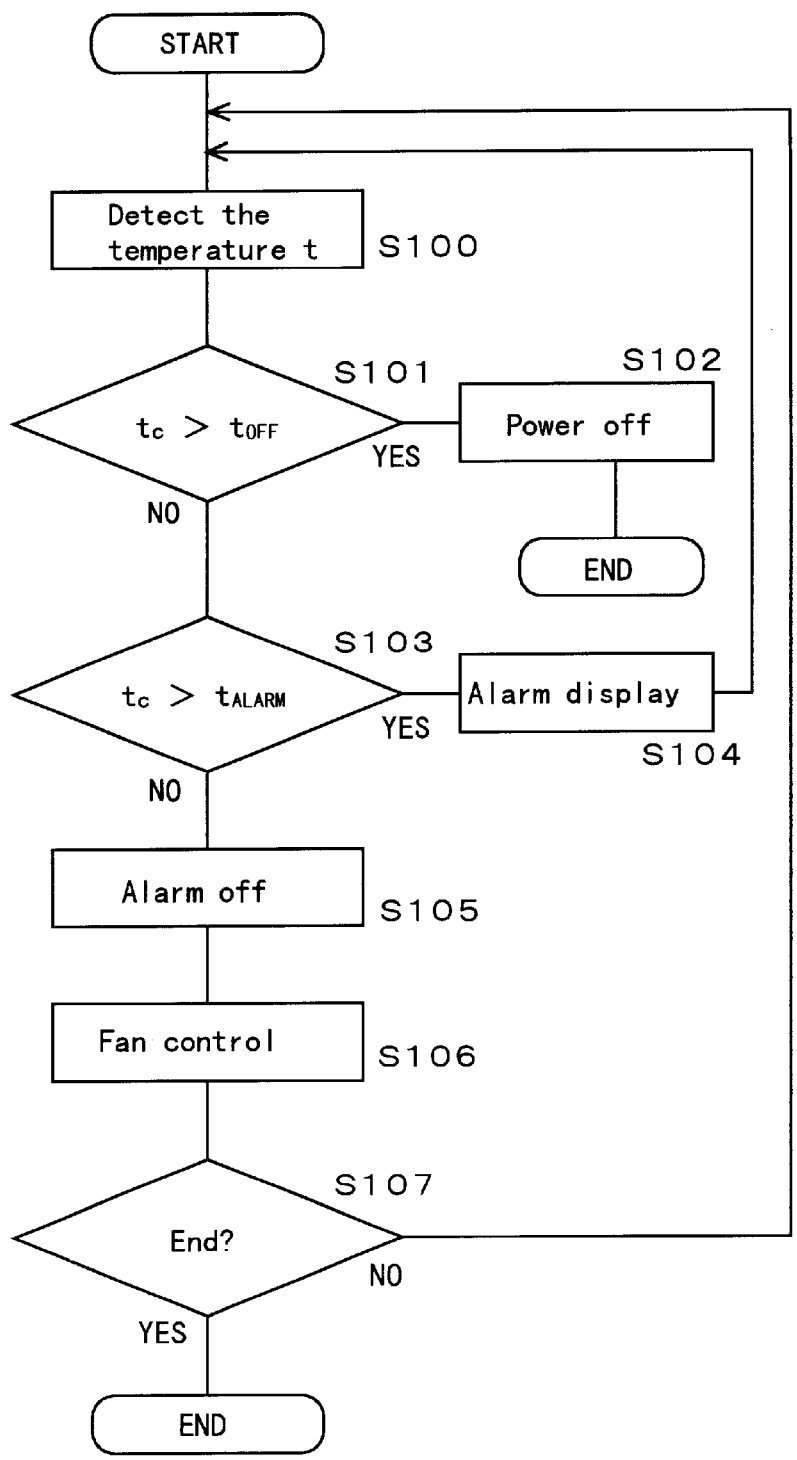
FIG. 16 is a flow chart showing operations at the control unit 80 of the conventional projection type display.

In FIG. 14, the lateral axis refers to the temperature difference (° C.) which is the differences of the environment temperature from the temperature detected by the temperature detecting element 30 and the vertical axis refers to the temperature of the liquid crystal light valve 4G. When the temperature difference is equal to 18° C., the temperature of the liquid crystal light valve 4G is equal to 60° C. and the temperature of the liquid crystal light valve 4G increases in accordance with the increase of the temperature difference.

By creating a compensation value table based on the graph shown in FIG. 14, for example, the temperature variations T0 of the liquid crystal light valve 4G when the temperature difference is equal to T can be acquired. The above description only replaces the air detection with the temperature difference detection in the procedure at the step S10 in the flow chart in FIG. 4 and the rest of the operation procedures are the same.

In this way, the temperature statuses of the liquid crystal light valves 4R, 4G and 4B are accurately grasped and "off" and "alarm" of the power source 26 can be appropriately displayed by only monitoring the temperature difference without the arrangement of the barometer 32 in the body, in this embodiment as well.

Though the above embodiment is described by the example using two temperature detecting elements in the above embodiment, it is possible to minimize the mechanical temperature margin by using more than three temperature detecting elements.

Next, a method for inputting the compensation value T0 without attaching the barometer in the apparatus as the method for detecting the air pressure is described. First, the table of the temperature compensation value T0 may be referred by inputting an air pressure value measured by another external barometer. For example, if the temperature compensation values T0 of 0, 1, 2, 3, 4 and 5 (° C.) are sought in order for the air pressures of 760, 720, 680, 640, 600 and 560 (mm Hg) respectively as a table, a predetermined temperature compensation value T0 may be selected by inputting the air pressure value accurately measured by another barometer. Second, the temperature compensation value T0 may be also directly input. Third, the table of the temperature compensation value T0 may be measured by in putting an altitude measured by another external altimeter. For example, if the temperature compensation values T0 of 0, 1, 2, 3, 4 and 5 (+ C.) are sought in order for the altitude of 1600, 3200, 4800, 6400 and 8000 feet respectively as a table, a predetermined temperature compensation value T0 may be selected by inputting the altitude accurately measured by the altimeter. According to these methods, since noises included in the measured values by the barometer incorporated in the liquid crystal projector 1 are not required to be considered, the handling can be easily performed. Further, other than inputting the above values which accurately determine T0, a rough compensation can be considered by providing a selector switch having several stages.

The present invention can be variously modified and is not limited to the above embodiment. For example, in the above embodiment, a transmission type liquid crystal light valves, which transmit the light directed from the lamp 2 to the dichroic mirror and the like, are used, the present invention is of course not limited to this and can use a reflection type liquid crystal light valve which uses reflection type liquid crystal panels to project the images on the screen 60 by reflecting the light from the light source.

Further, in the above embodiment, though the dichroic mirrors are used to synthesize each color from the liquid crystal light valves, dichroic prisms can be used without being limited to this.

Further, though the liquid crystal projector 1 according to the above embodiment is structured to be able to realize all of the above embodiments 1 through 7, it is not required in the present invention and a necessary structure is selectively prepared according to above each embodiment.

Furthermore, in the above embodiment, the thermistor is used for the temperature detecting element 30 and the like for a temperature measurement, other sensors, for example, such as a resistance thermometer sensor, a thermocouple, a radiation thermometer, sensors using elasticity or heat noise and the like, can be of course used.

Further, a procedure which accurately grasps the temperature statuses of the liquid crystal light valves 4R, 4G and 4B and appropriately displays "off" and "alarm" of the power source 26 is described in the above embodiment. Though the temperature compensation to the influence of the air pressure variations is realized through the controls of the cooling fans 10 and 12 in the apparatus body, the present invention is not limited to this. For example, when a relationship of a heat sink or a heat pipe versus a temperature detecting element receives the influence of the air pressure variations, the temperature compensation can be performed by monitoring the fan rotational frequency, applied voltage, wind velocity and the like used for cooling the heat sink or the heat pipe.

Further, in the above embodiment, though the description is made assuming the reference height (reference pressure) is the state of an atmospheric pressure, the present invention is not limited to this and an air pressure other than an atmospheric pressure can be adopted. For example, when the working condition of the apparatus or the arrangement position is under an air pressure other than an atmospheric pressure, the table of the temperature compensation values T0 may be of course created being based on the air pressure value at the position or an air pressure used most in accordance with an environment condition of the shipping position and the like of the apparatus may be a reference. For example, when the reference height (reference air pressure) is assumed to be 6,000 feet in altitude and 610 mm Hg in air pressure, the temperature compensation value T0 for 8,000 feet are equal to 1.25(° C.).

Further, in the above embodiment, though $T_C$ is assumed to be equal to t+T0, $t_{OFF}$ or $t_{ALARM}$ which are comparison objects can be compensated as $t_{OFF}$–T0 or $t_{ALARM}$–T0 or the like respectively.

As mentioned above, according to the present invention, since the temperature influence which the inside of the apparatus receives from the air pressure variations can be compensated, a specification cracking of the upper limit temperature of the working environment of the apparatus can be prevented. Further, a temperature loading of the optical members in the apparatus can be adequately suppressed by suppressing the redundancy of the temperature margin to the utmost, thereby preventing the members from deterioration and improving the reliability of the apparatus.

Furthermore, since the temperature compensation can be performed by using the fan rotational frequency or the applied voltage value which changes according to the air pressure, a projection type display which is simple and requires less cost increase is realized without increasing the number of new members for the air pressure detection and at the same time suppressing the larger and heavier apparatus.

What is claimed is:

1. A projection type display having a light valve arranged in a body for modulating and emitting an incident light from a light source and a cooling unit for cooling the inside of the body, and enlarging and projecting the light emitted from the light valve, comprising:

a temperature detecting element for detecting at least a temperature in the vicinity of the light valve; and a control system for compensating the temperature detected by the temperature detecting element by a temperature compensation value which compensates for a fluctuation in the temperature based upon a fluctuation in air pressure, and for controlling at least the cooling unit and on/off of the power source based on the compensated temperature.

2. A projection type display as set forth in claim 1, wherein the cooling unit has an intake fan for taking in the air in the body.

3. A projection type display as set forth in claim 2, further comprising an air pressure detecting unit for detecting an air pressure in a working environment, the control system determining the temperature compensation value based on the air pressure.

4. A projection type display as set forth in claim 2, wherein the control system comprises a fan rotational frequency detecting unit for detecting rotational frequencies of the intake fan and determines the temperature compensation value based on the rotational frequency.

5. A projection type display as set forth in claim 2, wherein the control system has a wind velocity detecting unit for detecting a wind velocity from the intake fan and determines the temperature compensation value based on the wind velocity.

6. A projection type display as set forth in claim 2, wherein the control system determines the temperature compensation value based on a voltage applied to the intake fan.

7. A projection type display as set forth in claim 2, wherein the control system determines the temperature compensation value based on a current running to the intake fan.

8. A projection type display as set forth in claim 1, wherein the cooling unit has an exhaust fan for taking out the air from the body.

9. A projection typed is play as set forth in claim 1, wherein the temperature detecting element at least comprises a first temperature detecting element for detecting the temperature in the vicinity of the light valve and a second temperature detecting element for detecting an external temperature in the vicinity of the outside of the body; and the control system determines the temperature difference between the temperature in the vicinity of the light valve and the temperature in the vicinity of the outside of the body from the measurement results of the first and second temperature detecting elements and also determines the temperature compensation value based on the temperature difference.

10. A projection type display having a light valve arranged in a body for modulating and emitting an incident light from a light source and a cooling unit having an intake fan for cooling the inside of the body, and enlarging and projecting the light emitted from the light valve, comprising:

a temperature detecting element for detecting at least a temperature in the vicinity of the light valve; and a control system for compensating the temperature detected by the temperature detecting element by a temperature compensation value and for controlling at least the cooling unit and on/off of the power source based on the compensated temperature;

wherein the control system comprises a fan rotational frequency detecting unit for detecting rotational frequencies of the intake fan and determines the temperature compensation value based on the rotational frequency.

11. A projection type display having a light valve arranged in a body for modulating and emitting an incident light from a light source and a cooling unit having an intake fan for cooling the inside of the body, and enlarging and projecting the light emitted from the light valve, comprising:

a temperature detecting element for detecting at least a temperature in the vicinity of the light valve; and a control system for compensating the temperature detected by the temperature detecting element by a temperature compensation value and for controlling at least the cooling unit and on/off of the power source based on the compensated temperature;

wherein the control system determines the temperature compensation value based on a voltage applied to the intake fan.

12. A projection type display having a light valve arranged in a body for modulating and emitting an incident light from a light source and a cooling unit having an intake fan for cooling the inside of the body, and enlarging and projecting the light emitted from the light valve, comprising:

a temperature detecting element for detecting at least a temperature in the vicinity of the light valve; and a control system for compensating the temperature detected by the temperature detecting element by a temperature compensation value and for controlling at least the cooling unit and on/off of the power source based on the compensated temperature;

wherein the control system determines the temperature compensation value based on a current running to the intake fan.

* * * * *

UNITED STATES PATENT AND TRADEMARK OFFICE
CERTIFICATE OF CORRECTION

PATENT NO.   : 6,322,218 B1  Page 1 of 1
DATED        : November 27, 2001
INVENTOR(S)  : Sugawara et al.

It is certified that error appears in the above-identified patent and that said Letters Patent is hereby corrected as shown below:

<u>Column 16,</u>
Line 35, delete "typed is play" and insert -- type display -- therefor.

Signed and Sealed this

Fourth Day of June, 2002

Attest:

Attesting Officer

JAMES E. ROGAN
Director of the United States Patent and Trademark Office